US012748925B2

(12) United States Patent
Brad et al.

(10) Patent No.: US 12,748,925 B2
(45) Date of Patent: Sep. 29, 2026

(54) SYSTEMS AND METHODS OF DETECTING CHATBOTS

(71) Applicant: Bitdefender IPR Management Ltd., Nicosia (CY)

(72) Inventors: Florin M. Brad, Campina (RO); Andrei M. Manolache, Bucharest (RO); Elena Burceanu, Bucharest (RO)

(73) Assignee: Bitdefender IPR Management Ltd., Nicosia (CY)

( * ) Notice: Subject to any disclaimer, the term of this patent is extended or adjusted under 35 U.S.C. 154(b) by 442 days.

(21) Appl. No.: 18/320,250

(22) Filed: May 19, 2023

(65) Prior Publication Data

US 2024/0386212 A1 Nov. 21, 2024

(51) Int. Cl.
*G06F 40/35* (2020.01)
*G06N 3/0475* (2023.01)

(52) U.S. Cl.
CPC .......... *G06F 40/35* (2020.01); *G06N 3/0475* (2023.01)

(58) Field of Classification Search
CPC .......... G06F 40/35; G06F 40/30; G06F 40/56; G06N 3/0475; H04L 51/02
See application file for complete search history.

(56) References Cited

U.S. PATENT DOCUMENTS 7,945,952 B1 * 5/2011 Behforooz .............. H04L 63/08 726/21
9,519,766 B1 * 12/2016 Bhosale .................. G06F 21/36
10,735,401 B2 * 8/2020 Lonas ...................... G06F 21/60
10,810,725 B1 * 10/2020 Dolhansky ......... G06V 10/7747
11,087,092 B2 * 8/2021 Zheng .................. G06N 3/0442
11,790,251 B1 * 10/2023 Powers ................. G06F 40/279 706/14
12,058,288 B1 * 8/2024 Koneru ................... G06F 40/40
2008/0004107 A1 * 1/2008 Nguyen .................. A63F 13/75 463/29
2018/0367488 A1 * 12/2018 Chasse .................. H04L 51/212
2020/0204505 A1 * 6/2020 Patil ........................ G06Q 10/10

(Continued)

OTHER PUBLICATIONS

European Patent Office (EPO), International Search Report (ISR) and Written Opinion (WO) mailed Sep. 5, 2024 for PCT International Application No. PCT/EP2024/063640, international filing date May 17, 2024.

(Continued)

*Primary Examiner* — Douglas Godbold
(74) *Attorney, Agent, or Firm* — Law Office of Andrei D Popovici, PC

(57) ABSTRACT

Some embodiments determine whether an entity engaging in online conversations comprises a chatbot. A challenge message is constructed according to a current context of an ongoing conversation, by employing a generative language model to determine a plausible conversation sequel and subsequently distorting the respective sequel. The challenge is added as a new message to the respective conversation. The chatbot detector may then determine whether a conversation partner is a chatbot according to a similarity between a response to the challenge received from the respective conversation partner and an artificially generated, plausible response to the undistorted conversation sequel. Distortions applied to construct the challenge are deliberately crafted to send a chatbot on a markedly different trajectory.

21 Claims, 7 Drawing Sheets

(56) References Cited

U.S. PATENT DOCUMENTS

| | | | | |
|---|---|---|---|---|
| 2020/0218780 | A1* | 7/2020 | Mei | G06N 3/08 |
| 2020/0342879 | A1* | 10/2020 | Carbune | G10L 25/51 |
| 2022/0164643 | A1* | 5/2022 | Charnock | G06N 5/046 |
| 2022/0284194 | A1* | 9/2022 | Galitsky | G06F 40/35 |
| 2022/0327108 | A1* | 10/2022 | Manolache | G06N 20/00 |
| 2023/0179628 | A1* | 6/2023 | Porras | G06F 40/30 726/22 |
| 2023/0288990 | A1* | 9/2023 | Prasad | G06F 40/274 |
| 2024/0363107 | A1* | 10/2024 | Odiorne | G10L 17/24 |
| 2024/0386188 | A1* | 11/2024 | Bandel | G06F 40/56 |
| 2025/0022473 | A1* | 1/2025 | Eilam Tzoreff | G10L 17/26 |

OTHER PUBLICATIONS

Dukic et al., "Are You Human? Detecting Bots on Twitter Using BERT," 2020 IEEE 7th International Conference on Data Science and Advanced Analytics (DSAA), Oct. 2020.

Garcia-Silva et al., "Understanding Transformers for Bot Detection in Twitter," arXiv:2104.06182v1, Apr. 2021.

Heidari et al., "Bert Model for Social Media Bot Detection," Working paper, Volgenau School of Engineering Graduate Research, George Mason University, http://jbox.gmu.edu/bitstream/handle/1920/12756/bertf.pdf, Mar. 2022.

Iliou et al., "Web Bot Detection Evasion Using Generative Adversarial Networks," 2021 IEEE International Conference on Cyber Security and Resilience (CSR), Jul. 2021.

Kumar et al., "Content Based Bot Detection using Bot Language Model and BERT Embeddings," 5th International Conference on Computer, Communication and Signal Processing (ICCCSP—2021), May 2021.

McIntire et al., "Methods for chatbot detection in distributed text-based communications," 2010 International Symposium on Collaborative Technologies and Systems, May 2010.

Kudugunta et al., "Deep Neural Networks for Bot Detection," arXiv:1802.04289v2, Feb. 2018.

Stanton et al., "GANs for Semi-Supervised Opinion Spam Detection," arXiv:1903.08289v2, May 2019.

Boucher et al., "Bad Characters: Imperceptible NLP Attacks," arXiv:2106.09898v2, Dec. 2021.

Perez et al., "Red Teaming Language Models with Language Models," arXiv:2202.03286v1, Feb. 2022.

Morris et al., "TextAttack: A Framework for Adversarial Attacks, Data Augmentation, and Adversarial Training in NLP," arXiv:2005.05909v4, Oct. 2020.

* cited by examiner

SYSTEMS AND METHODS OF DETECTING CHATBOTS

BACKGROUND OF THE INVENTION

The invention relates to artificial intelligence, and in particular to employing artificial intelligence (AI) to automatically determine whether an entity engaging in electronic messaging is a robot.

Recent developments in AI are driving sweeping changes in virtually every aspect of human activity. A particular class of AI applications is directed at human-machine interaction and comprises the development of language models enabling a computer to communicate in a natural language such as English or Chinese. While creating vast opportunities for business development by enabling the automation of various tasks such as customer service and information retrieval, language model-enabled software agents (commonly known as chat robots or chatbots) are also posing unprecedented technical and ethical challenges. As chatbots become ever more sophisticated and capable of engaging in realistic conversation, it becomes truly difficult to distinguish human from machine. Unscrupulous entities may exploit such confusion for purposes such as fraud, unsolicited communications (spam), identity theft, large-scale disinformation, and political manipulation, among others.

The problem of determining whether a conversation partner is a human or a computer is generically known as a Turing test and is almost as old as information technology itself. Several methods of implementing a Turing test have been proposed for various applications, most recently related to communicating via the Internet. One example comprises a category of methods collectively known as Completely Automated Public Turing tests to tell Computers and Humans Apart (CAPTCHA). In various embodiments, CAPTCHA comprises issuing a challenge (e.g., an image recognition problem) in response to an attempt to access an online service (e.g., a particular web page), and selectively allowing access to the respective service according to a response to the respective challenge. Such methods implicitly rely on the current inability of a typical software agent to solve the particular type of problem used as challenge. However, recent developments in AI and language modelling are quickly rendering such conventional Turing tests obsolete.

For the reasons outlined above, there is a renewed interest in developing robust and effective Turing tests.

SUMMARY OF THE INVENTION

According to one aspect, a computer system comprises at least one hardware processor configured to employ a generative language model to generate a surrogate conversation sequel and a surrogate response. The surrogate conversation sequel comprises a predicted continuation of an ongoing online conversation comprising a sequence of messages. The surrogate response comprises a predicted response from a conversation partner to the surrogate conversation sequel. The at least one hardware processor is further configured to, in response, distort the surrogate conversation sequel to produce a challenge message and add the challenge message to the ongoing online conversation. The at least one hardware processor is further configured to, in response to receiving a partner response from the conversation partner, the partner response comprising a response to the challenge message, determine whether the conversation partner comprises a robot according to a similarity between the partner response and the surrogate response.

BRIEF DESCRIPTION OF DRAWINGS

The foregoing aspects and advantages of the present invention will become better understood upon reading the following detailed description and upon reference to the drawings where.

DETAILED DESCRIPTION OF THE INVENTION

Figure 1:
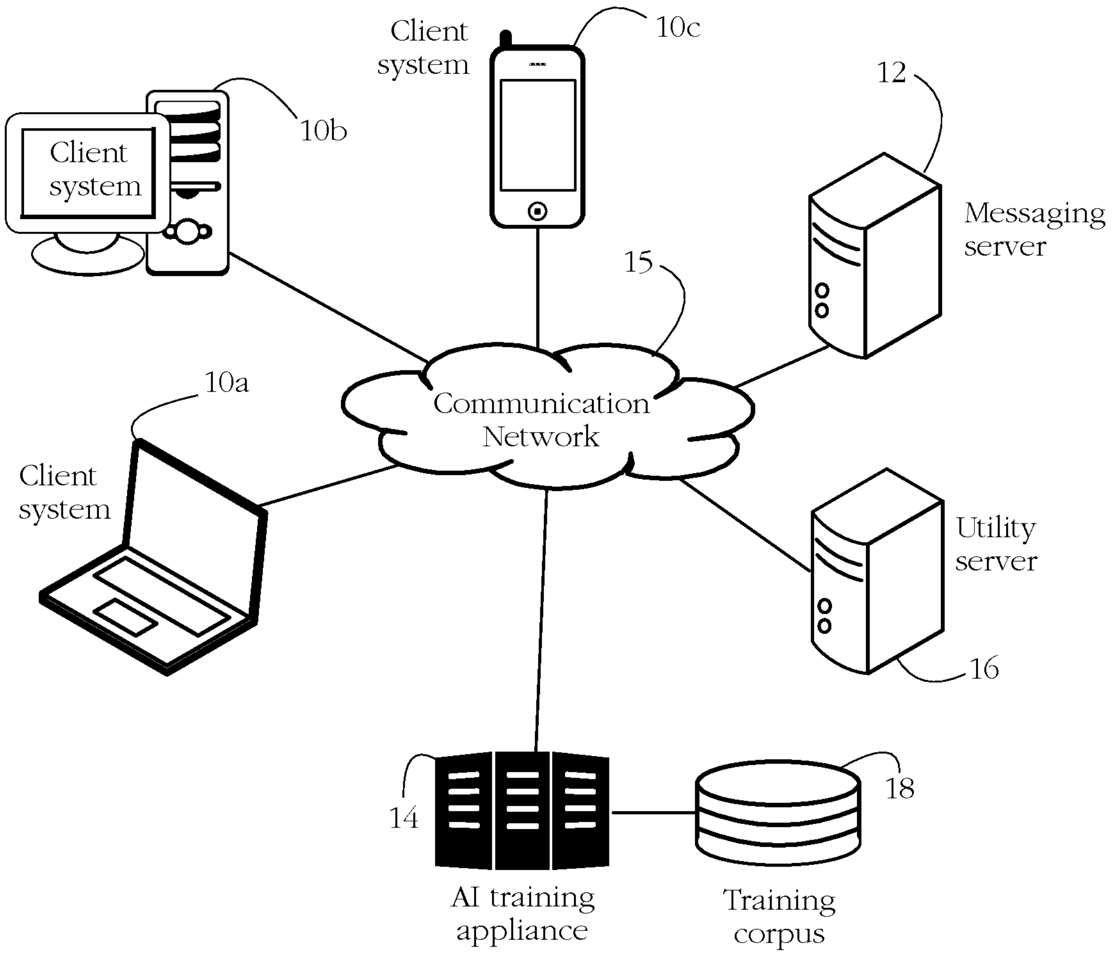
FIG. 1 shows a plurality of client devices engaging in electronic communications and a set of server computers implementing a chatbot detector according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g., data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

Embodiments of the present invention are directed at detecting chatbots masquerading as humans in online conversations. A chatbot herein denotes any computer program configured to automatically generate text formulated in a natural language such as English, Russian, and Chinese, among others, and to interface with a messaging application to transmit the respective text to another computer system. Generating text comprises effectively creating the respective text fragment (for instance by automatically concatenating words extracted from a dictionary according to an algorithm and/or language model), as opposed to merely encoding text provided by a human operator. An online conversation herein comprises a sequence of electronic messages exchanged among a set of partners via a messaging application and/or online platform. Messages may vary in format according to the respective messaging platform, protocol, and/or application, but in general an electronic message may comprise an encoding of a text part and/or an encoding of a media file (e.g., image, movie, sound, etc.). The text part may comprise text written in a natural language and other alphanumeric and/or special characters such as emoticons, among others.

For clarity, the following description will focus on processing text messages. However, a skilled artisan will know that the described systems and methods may be adapted to other kinds of messaging such as audio/video (e.g., spoken text) or a combination thereof. For instance, some embodiments may determine whether an audio file comprising a spoken message was generated by a chatbot. In one exemplary embodiment, a speech-to-text translator may be used to convert an audio file into a text fragment and then apply methods described herein in relation to text messaging.

Online messaging encompasses peer-to-peer messaging as well as messaging via public chatrooms, forums, social media sites, etc. Examples of online conversations include an exchange of short message service (SMS) messages, a sequence of e-mail messages, and a sequence of messages exchanged via instant messaging applications such as WhatsApp Messenger®, Telegram®, WeChat®, and Facebook® Messenger®, among others. Other exemplary online conversations include a content of a Facebook® wall, a chat conducted on an online forum such as Reddit® and Discord®, and a set of comments to a blog post. Exemplary messaging applications according to embodiments of the present invention include client-side instances of mobile applications such as WhatsApp®, Facebook®, Instagram®, SnapChat® etc., as well as software executing the server side of the respective messaging operations. Other examples of messaging application include an email client and an instance of an Internet browser.

The following description illustrates embodiments of the invention by way of example and not necessarily by way of limitation.

FIG. 1 shows a set of exemplary client systems 10*a-c* engaging in online conversation over a communication network 15 such as the Internet. Parts of network 15 may include a local area network (LAN) and a telecommunication network (e.g., mobile telephony). Client systems 10*a-c* generically represent any electronic appliance having at least one processor and means of connecting to network 15. Exemplary clients 10*a-c* include personal computers, mainframe computers, mobile computing devices (laptops, smartphones, tablet computers, etc.), wearable computing devices (e.g., smartwatches, etc.), as well as household devices (smart refrigerator, home security system, etc.), and computerized vehicles, among others.

In typical online messaging scenarios such as social media platforms and online forums, messages are centralized, routed and/or dispatched by a messaging server 12, for instance using a client-server protocol. Stated otherwise, individual messages sent by multiple client systems 10*a-c* may accumulate at messaging server 12, which may selectively display, or otherwise deliver them to their intended destination. In alternative embodiments, electronic messaging uses a de-centralized network of individual peer-to-peer connections between client systems 10*a-c*.

In some embodiments, a chatbot detector determines whether at least a part of an online conversation (i.e., a set of messages) was automatically generated. For instance, the chatbot detector may determine whether a selected client system 10*a-c* comprises a chatbot masquerading as a human in online conversations. Exemplary embodiments of the chatbot detector include a set of interconnected computer programs, dedicated hardware modules, or a combination thereof. In some embodiments, at least a part of the chatbot detector may execute on a utility server 16 which may include a set of interconnected computer systems further connected to communication network 15. In some embodiments as described herein, a chatbot detector comprises an artificial intelligence (AI) system comprising a set of pre-trained neural networks. Training the respective AI system may be carried out on a dedicated AI training appliance 14.

Figure 2:
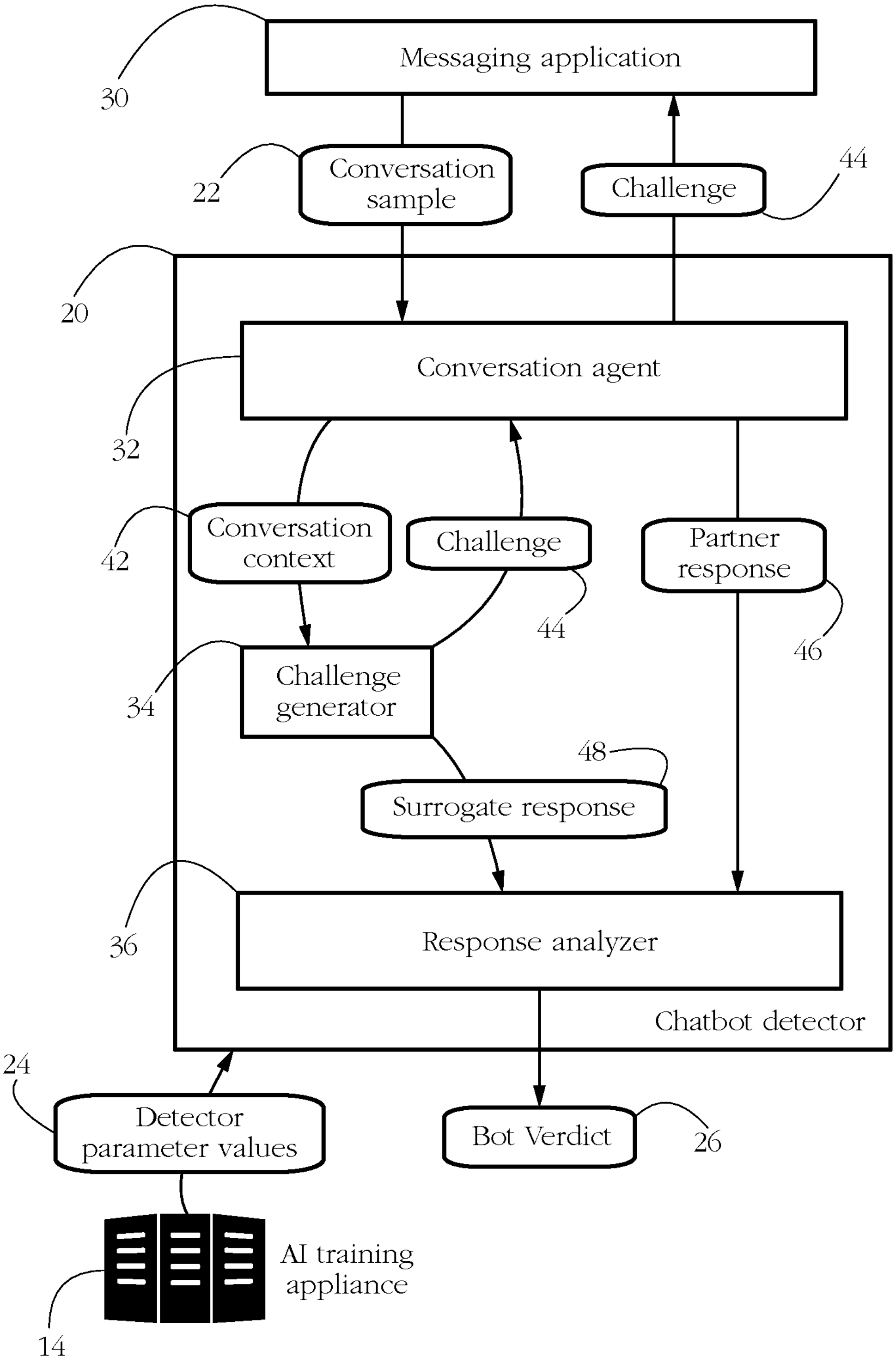
FIG. 2 illustrates an exemplary configuration of a chatbot detector according to some embodiments of the present invention.

FIG. 2 illustrates exemplary components of a chatbot detector 20 according to some embodiments of the present invention. Detector 20 may comprise computer programs executing on at least one hardware processor of a client system such as client systems 10*a-c* in FIG. 1. In alternative embodiments, some or all illustrated components of chatbot detector 20 may execute on messaging server 12 and/or utility server 16. A skilled artisan will also know that in alternative embodiments, some or all of the illustrated components may be embodied as hardware modules, for instance as field-programmable gate arrays (FPGA) or application-specific integrated circuits (ASIC).

Figure 3:
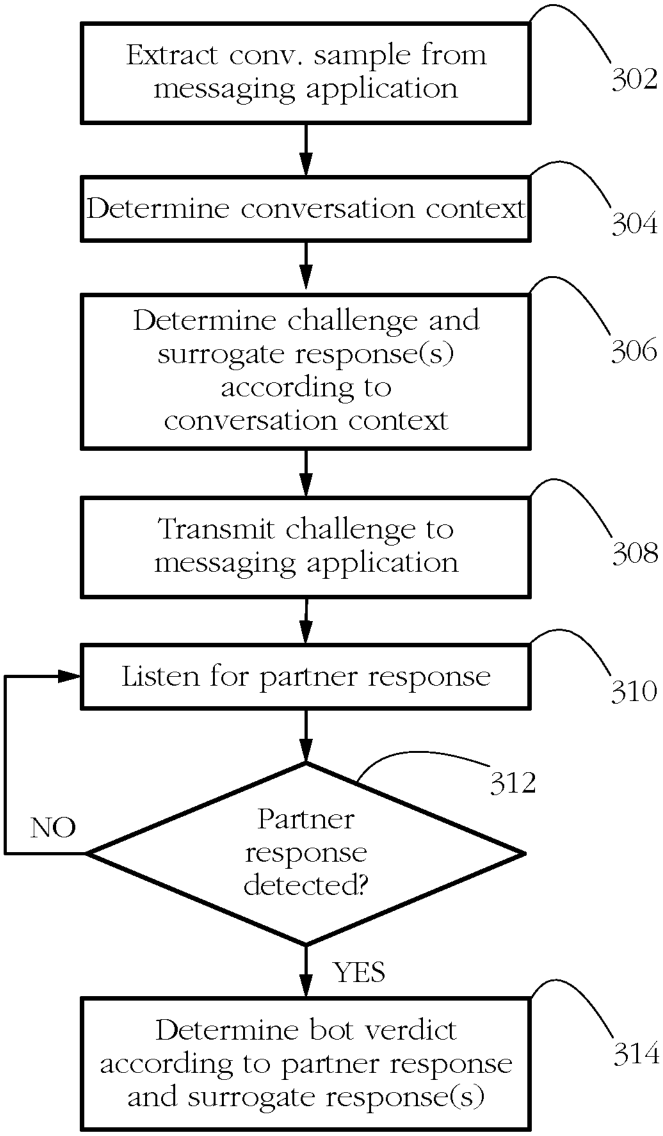
FIG. 3 shows an exemplary sequence of steps performed by a chatbot detector according to some embodiments of the present invention.

FIG. 3 further illustrates an exemplary sequence of steps performed by chatbot detector 20 according to some embodiments of the present invention. The illustrated method includes automatically generating a challenge (e.g., a new message) according to a context of a current conversation and inserting the respective challenge into the respective conversation. A response to the challenge received from a conversation partner may then be compared to a surrogate response automatically generated by detector 20, which then determines whether the respective conversation partner comprises a chatbot according to a result of the comparison. Exemplary components of detector 20 are described below.

In some embodiments, detector 20 comprises a conversation agent 32 interconnected with a challenge generator 34 and a response analyzer 36. Conversation agent 32 may interface with a messaging application 30 generically representing any software configured to enable a user of the respective client system to exchange electronic messages with other users. Exemplary messaging applications 30 include a local instance of a Facebook® mobile application and a local instance of an Internet browser, among others, as well as server-side components of messaging platforms as described above. Application 30 may display a content of each electronic message on an output device (e.g., screen) of the respective client system and may further organize messages according to sender, recipient, time, subject, or other criteria. Application 30 may further receive input from the user (e.g., from a keyboard, touchscreen, dictation interface, etc.), formulate electronic messages according to the received input, and transmit electronic messages to messaging server 12 and/or directly to other client systems 10*a-c*. Transmitting a message may comprise, for instance, adding an encoding of the respective message to an outbound queue of a communication interface of the respective client system.

Interfacing with application 30 includes retrieving and/or transmitting data from/to application 30. For instance, agent 32 may be configured to parse an ongoing online conversation and extract a conversation sample 22 including selected parts copied from the respective conversation. Extracting conversation samples may comprise identifying individual messages of a conversation and determining message-specific features such as a sender and/or receiver, a time of transmission (e.g., timestamp), a text of the respective message, and possibly other content data such as an image attached to the respective message. Interfacing with messaging application 30 may further include transmitting a challenge 44 to application 30, challenge 44 comprising a deliberately crafted message for insertion into the respective online conversation, as described in more detail below.

Conversation agent 32 may be implemented using any method known in the art. In one exemplary embodiment, agent 32 may be incorporated into messaging application 30, for instance as an add-on or plugin (e.g., a browser extension). Such embodiments may use the functionality of application 30 to extract and/or to insert data to/from ongoing conversations. Other exemplary embodiments of agent 32 may employ techniques known in the art of robotic process automation, for instance using a local driver to automatically identify elements of a user interface of messaging application 30 and mimic the way in which a human user would interact with it to read and write messages. Some such embodiments may extract message content using built-in features of the local operating system, such as an accessibility application programming interface (API)-software typically used for grabbing information currently displayed on screen for the purpose of making such information accessible to people with disabilities. Agent 32 may further parse various data structures such as a user interface tree or document object model (DOM) to identify individual messages and extract their content and other information such as an identity of the sender, etc.

In alternative embodiments, messaging application 30 may be surreptitiously modified (for instance by hooking) to install conversation agent 32. For instance, a code patch may be inserted into application 30, the respective code configured to transparently invoke execution of agent 32 whenever messaging application 30 performs a particular action, such as receiving or transmitting a message. Yet another embodiment of agent 32 may extract message content directly from intercepted network traffic going into messaging application 30 and/or passing via a network adapter(s) of the respective client device 10*a-c*. Such communication interceptors may implement communication protocols such as HTTP, WebSocket, and MQTT, among others, to parse communications and extract structured message data. When instant messages are encrypted, some embodiments employ techniques such as man-in-the-middle (MITM) to decrypt traffic for message content extraction.

Some embodiments of the present invention rely on the observation that modern chatbots are typically aware of a conversation's context, i.e., they generate individual messages according to a content of other messages previously exchanged during an ongoing conversation. Therefore, some embodiments of conversation agent 32 are further configured to organize messages into conversations. A conversation herein comprises a sequence of individual messages exchanged between the same pair of interlocutors (in the case of a one-to-one exchange), or within the same group (in the case of a group chat, for instance). In one exemplary embodiment, conversation agent 32 may identify a sender and/or receiver of each intercepted message, and attach a label to each message, the label creating an association between the respective message and a conversation. Following such labeling, messages may be selectively retrieved according to conversation and ordered according to a message-specific timestamp. In an alternative embodiment, conversation agent 32 may store each conversation as a separate data object comprising a concatenation of messages selected according to sender and/or recipient and arranged in the order of transmission according to their respective timestamp.

An exemplary conversation data object may further include a set of media indicators, for instance copies of image/video/audio files attached to messages belonging to the respective conversation, or a network address/URL where the respective media file is located. Other exemplary media indicators may include an indicator of a media format (encoding protocol), etc. A skilled artisan will understand that the actual data format of conversation objects may differ among embodiments; exemplary formats include a version of an extensible markup language (XML), and Javascript Object Notation (JSON), among others.

In some embodiments, in a step 302 (FIG. 3), conversation agent 32 may extract a conversation sample 22 from messaging application 30. In a text processing embodiment, sample 22 may comprise a fragment of text, for instance a content of an individual text message. A step 304 may further determine a conversation context 42 according to sample 22. In some embodiments, conversation context 42 comprises a selected part of a conversation, for instance a concatenation of a set of recent messages forming a part of a selected conversation. In a simple example, context 42 may consist of an entire conversation. Another exemplary conversation context 42 comprises a concatenation of N most recent messages, arranged according to timestamp. In typical examples, N may range from one to several tens of messages. In some embodiments, conversation context 42 is constructed to exclusively include messages formulated by a particular target user, or exchanged among a particular target group of interlocutors. The target user or group may be indicated by an operator, for instance via a user interface of chatbot detector 20. In one such example, the operator may be invited to click/tap or otherwise select a part of a conversation or a set of interlocutors from a user interface of messaging application 30. In response, conversation agent 32 may select messages according to author, timestamp, etc., for inclusion in conversation context 42. Some examples of conversation context 42 are further disclosed below in relation to FIG. 5.

In response to determining conversation context 42, agent 32 may transmit context 42 to challenge generator 34. In some embodiments, challenge generator 34 is configured to automatically construct a challenge 44 and at least one surrogate response 48 to the respective challenge (a step 306 in FIG. 3) according to conversation context 42. In some embodiments, challenge 44 comprises a fragment of artificially generated text, for instance a text message formulated as a potential continuation of an ongoing conversation. To produce challenge 44 and/or surrogate response(s) 48, some embodiments of challenge generator 34 employ an artificial intelligence module implementing a generative language model, such as a set of generative pre-trained transformer (GPT) neural networks, among others. The respective AI module may execute on the respective client system. In an alternative embodiment, the AI module charged with generating challenge 44 and/or response(s) 48 may execute remotely, for instance on utility server 16. In such embodiments, generator 34 may transmit an encoding of conversation context 42 to server 16 and receive an encoding of challenge 44 and/or responses 48 in exchange.

Figure 4:
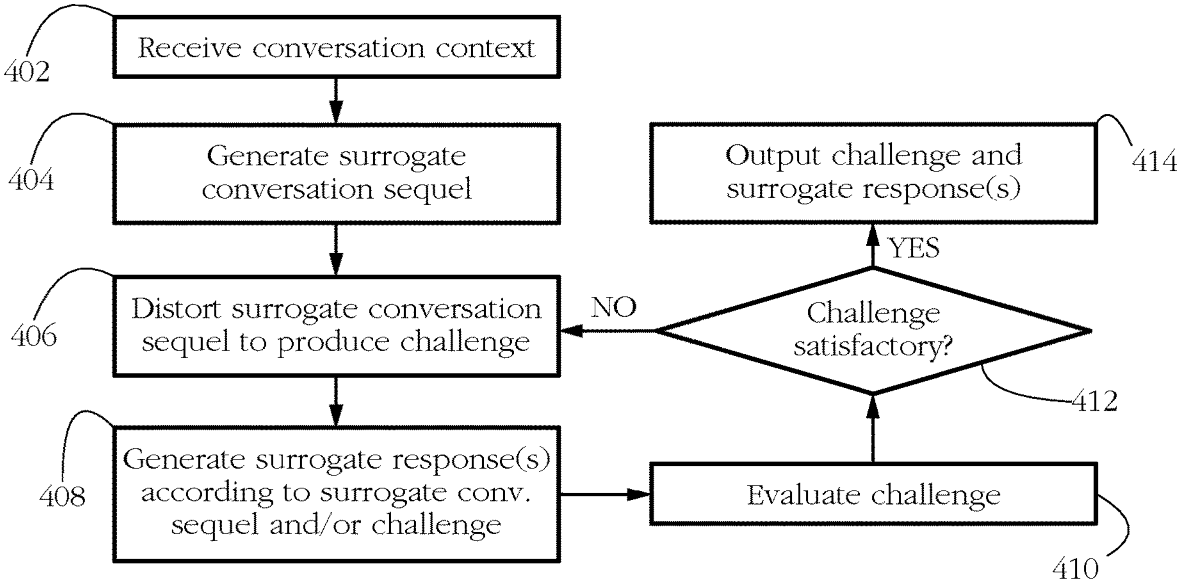
FIG. 4 shows an exemplary sequence of steps performed by a challenge generator component of the chatbot detector according to some embodiments of the present invention.
Figure 5:
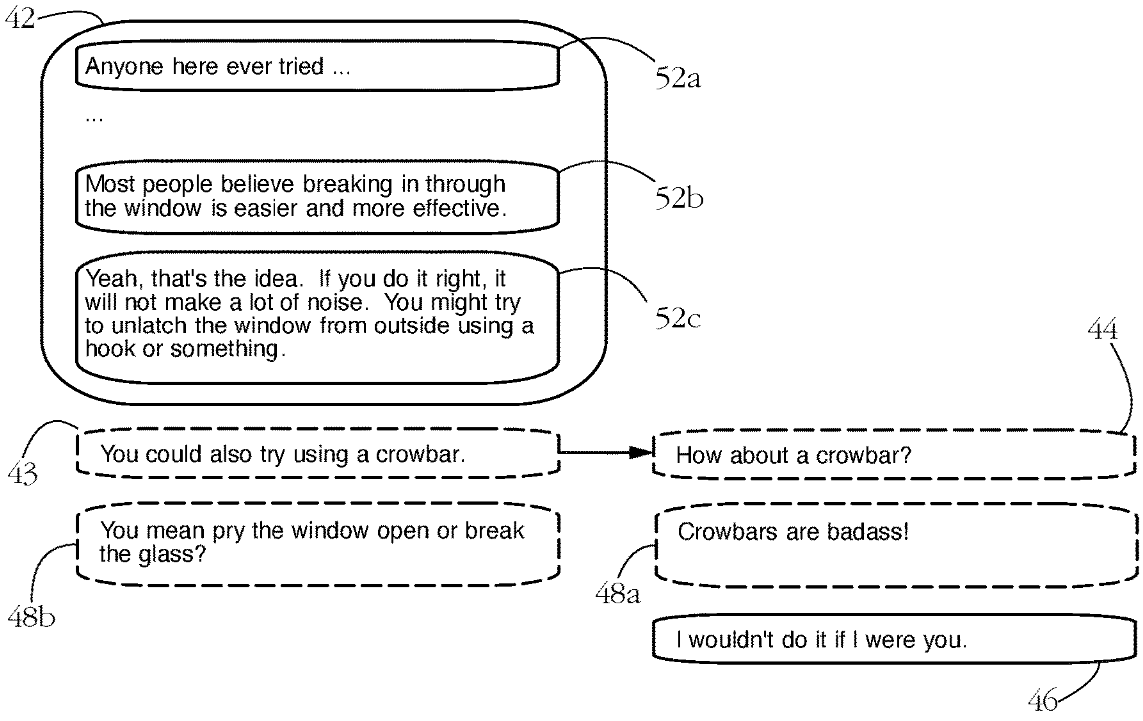
FIG. 5 illustrates an exemplary conversation context, surrogate conversation sequel, challenge, and surrogate responses according to some embodiments of the present invention.

FIG. 4 shows an exemplary sequence of steps performed by challenge generator 34 to generate challenge 44 and surrogate response(s) 48 according to some embodiments of the present invention. As such, the flowchart illustrated in FIG. 4 details step 306 in FIG. 3. In a step 402, generator 34 receives an indicator of a conversation context from conversation agent 32. An exemplary conversation context 42 comprising a sequence of messages 52*a-c* of an ongoing conversation is illustrated in FIG. 5. Messages 52*a-c* may form a part of an instant message conversation (e.g., WhatApp® exchange), or may be part of a conversation posted on an online forum such as Reddit® or Discord®, for instance. In some embodiments, conversation context 42 selectively contains a subset of messages of the respective conversation, selected according to timestamp (e.g., the most receive 10 messages of a conversation) and/or according to author (e.g., the latest 3 messages received from a particular conversation partner).

Next, in a step 404, generator 34 may employ a generative language model to determine a surrogate conversation sequel 43 according to conversation context 42. Surrogate sequel 43 is deliberately constructed to predict or mimic a continuation (e.g., a new message) of an ongoing conversation represented by context 42. The modifier "surrogate", as applied to "sequel" and "response", is used herein to indicate that the respective item is an artefact produced by challenge generator 34, as opposed to a real message exchanged via messaging application 30. In the example of FIG. 5, all items enclosed within dashed borders are surrogates. Exemplary surrogate sequel 43 mimics or predicts a response to message 52*c*. Exemplary surrogate responses 48*a-b* mimic or predict responses to challenge 44 and surrogate conversation sequel 43, respectively. In contrast, an exemplary partner response 46 comprises another response to challenge 44, response 46 received from an actual conversation partner via messaging application 30.

Generator 34 may apply any generative language model known in the art to produce surrogate conversation sequel 43. Typical language models receive an input text fragment and produce an output text fragment comprising a computed continuation of the input text fragment. A model may be invoked iteratively, wherein at every step the input is modified according to the output determined at a previous step, for instance by concatenation. Language models are typically pre-trained on large text corpora and are language-specific.

One exemplary architecture of an AI module implementing a generative language model comprises a convolutional neural network (CNN) layer followed by a dense (i.e., fully connected) layer further coupled to a rectifier (e.g., ReLU or other activation function) and/or a loss layer. Alternative embodiments may comprise a CNN layer feeding into a recurrent neural network (RNN), followed by fully connected and ReLU/loss layers. Convolutional layers effectively multiply an internal representation of each token of a sequence with a matrix of weights known in the art as filters, to produce an embedding tensor so that each element of the respective tensor has contributions from a respective token, but also from other tokens adjacent to the selected token. The embedding tensor therefore collectively represents the input token sequence at a granularity that is coarser than that of individual tokens. The filter weights are adjustable parameters which may be tuned during a training process.

Recurrent neural networks (RNN) form a special class of artificial neural networks, wherein connections between the network nodes form a directed graph. Several flavors of RNN are known in the art, including long-short-term-memory (LSTM) networks and graph neural networks (GNN), among others. A typical RNN comprises a set of hidden units (e.g., individual neurons), and the topology of the network is specifically configured so that each hidden unit receives an input (e.g., embedding vector) characterizing a respective token $t_j$, but also an input provided by an adjacent hidden unit, which in turn receives an input characterizing a token $t_{j-1}$ preceding token $t_j$ within the input token sequence. As a result, the output of each hidden unit is influenced not only by the respective token $t_j$, but also by the preceding token $t_{j-1}$. Stated otherwise, an RNN layer may process information about each token in the context of previous token(s). Bi-directional RNN architectures may process information about each token in the context of both previous and subsequent token(s) of the input token sequence.

Yet another exemplary embodiment of an AI module for generating surrogate conversation sequel 43 comprises a stack of transformer neural network layers. The transformer architecture is described, for instance, in A. Vaswani et al., 'Attention is all you need', arXiv:1706.03762, among others. For each input token sequence, transformer layers may produce a sequence of contextualized token embedding vectors, wherein each token embedding vector encodes information from multiple (e.g., all) tokens $t_j$ of the input sequence. The output of the transformer layers may be fed into multiple distinct classifier modules (e.g., dense layers) known in the art as prediction heads, which in turn determine output tokens and therefore construct a continuation to the input tokens sequence.

Figure 6:
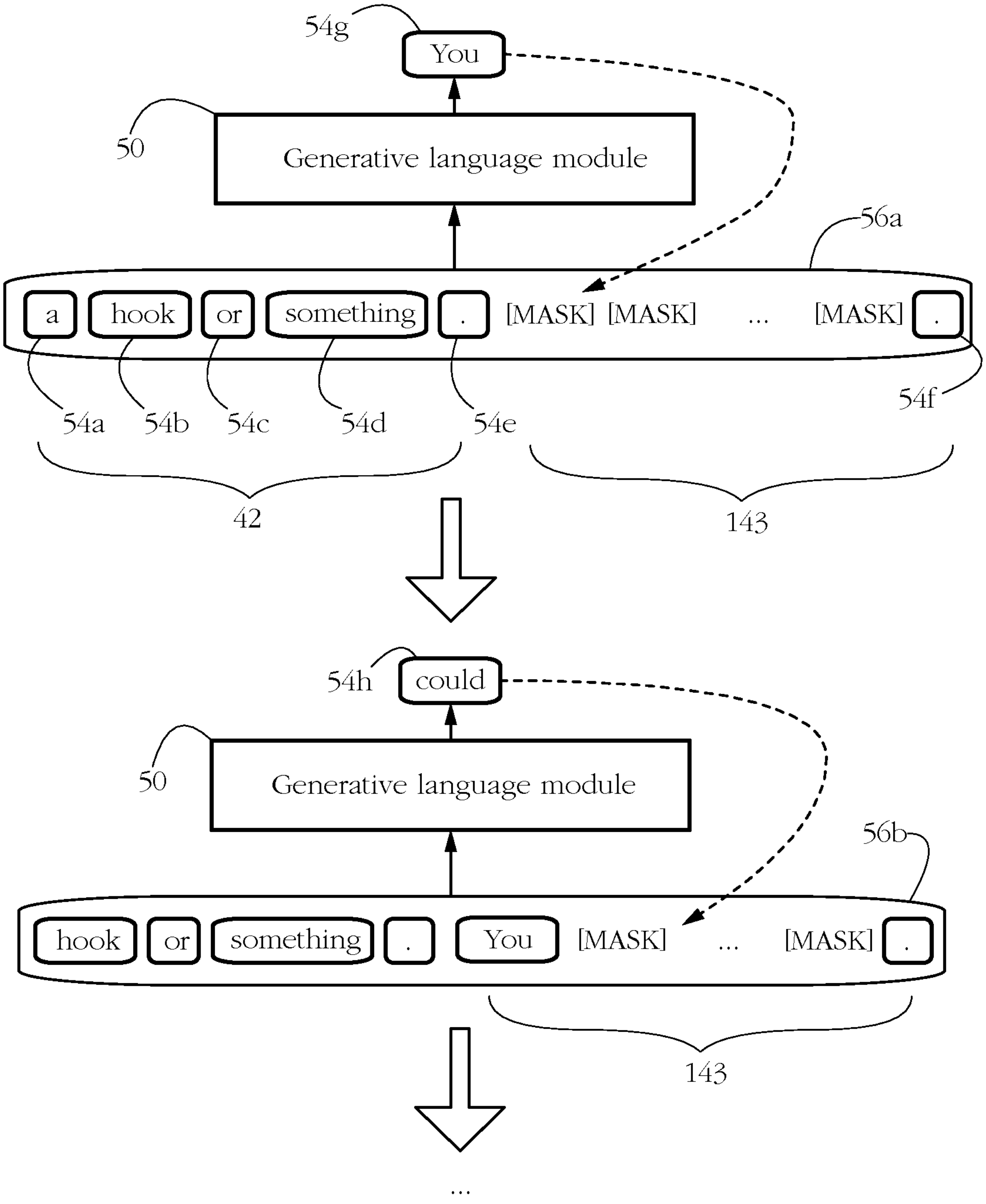
FIG. 6 illustrates an exemplary procedure of generating surrogate text according to some embodiments of the present invention.

FIG. 6 shows an exemplary procedure of generating surrogate conversation sequel 43 in an embodiment implementing a Bidirectional Encoder Representations from Transformers (BERT) language model. The top and bottom of FIG. 6 illustrate consecutive iterations, respectively. A generative language module 50 comprising a set of pre-trained neural networks is configured to receive an input token sequence 56*a-b* (text fragment) comprising conversation context 42 (see also FIG. 5). In various embodiments, individual tokens 54*a-e* may include individual words 54*a-d*, phrases, numbers, alphanumeric characters, emojis, and punctuation marks 54*e-f*, among others. Some embodiments further use a special token, herein [MASK], to represent a placeholder that can receive any token.

In some embodiments as illustrated, the input token sequence further comprises a provisional sequel 143 projecting conversation context 42 into the future. Initially, provisional sequel 143 may consist exclusively of placeholder tokens, as illustrated in the upper half of FIG. 6.

However, in alternative embodiments, by varying the position and number of [MASK] tokens, module 50 may be coaxed into generating surrogate sequels 43 having various desired features, such as a pre-determined length, a pre-determined syntax, a pre-determined sentence type (interrogative, exclamative, etc.), and/or a set of pre-determined, fixed tokens (e.g., certain desired keywords and/or special characters, emojis, etc.). Such parameters may be tuned during a training procedure, to produce conversation sequels which fit various criteria. The illustrated generative language module 50 is configured to determine an output token 54*g-h* according to input token sequence 56*a-b*, respectively. In some embodiments, to advance to a next iteration, the input token sequence is modified by replacing one of the [MASK] placeholders with the output token produced in the current iteration. In the example of FIG. 6, input token sequence 56*a* is modified by replacing the first [MASK] token with output token 54*g*, to produce updated input sequence 56*b*, which is in turn modified by replacing another [MASK] placeholder with token 54*h* to produce another input token sequence used in a subsequent iteration, etc. The process may be repeated until all [MASK] placeholders are replaced with output tokens, at which point provisional sequel 143 is exported as surrogate conversation sequel 43.

In response to determining surrogate conversation sequel 43, a step 406 may distort conversation sequel 43 to produce challenge 44. Some embodiments rely on the observation that deep neural networks are extremely complex systems and as such are prone to exhibiting chaotic behavior. One of the signatures of chaotic dynamics is the extreme sensitivity to initial conditions, wherein small differences in the initial state of a chaotic system grow exponentially fast, a phenomenon sometimes referred to as "the butterfly effect" in popular culture. A consequence of such sensitivity is that a chaotic system may be sent on a vastly different trajectory by the slightest nudge. Such behavior translates to the field of generative language models, where various computer experiments have revealed that the same model may produce substantially different output when fed input text that differs only slightly. Building on such observations, some embodiments distort surrogate conversation sequel 43 in a deliberate attempt to construct a challenge 44 that causes the respective chatbot to depart on a diverging trajectory, thus enabling chatbot detection.

Figure 7:
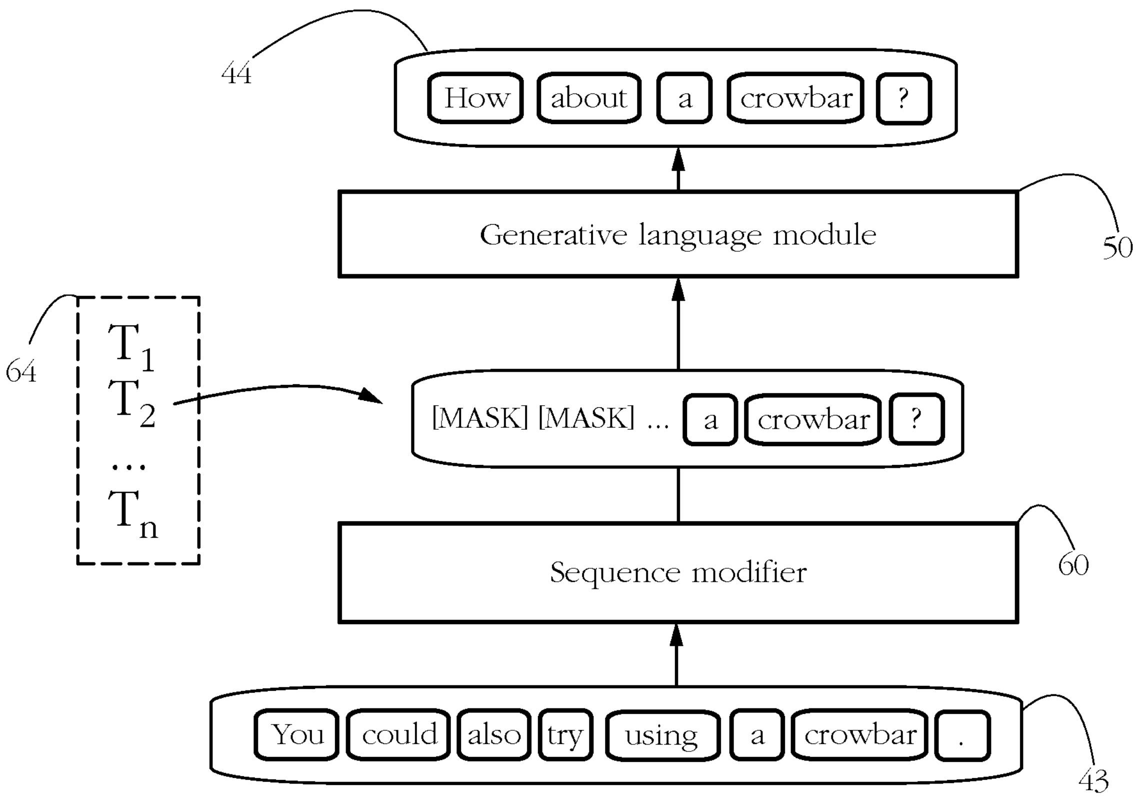
FIG. 7 shows an exemplary method of generating a challenge by distorting a surrogate conversation sequel according to some embodiments of the present invention.

In some embodiments, challenge generator 34 comprises a sequence modifier 60 as illustrated in FIG. 7, modifier 60 configured to distort surrogate conversation sequel 43 by selectively applying a set of transformations 64. An illustrated exemplary transformation $T_2$ converts an affirmative sentence into an interrogative one. Another exemplary transformation may rephrase sequel 43*b* to alter its sentiment, for instance from neutral to angry, aggressive, sad, happy, excited, etc. Some transformations $T_i$ may replace selected tokens/words/phrases of sequel 43 with substitutes which are in a pre-determined semantical relation with the replaced items (e.g., antonyms, synonyms, etc.). Other exemplary transformations $T_i$ apply selected inflections to selected tokens, thus altering various grammatical attributes such as tense, mood, person, number, case, and gender. Some other exemplary transformations alter the spelling of selected tokens, e.g., capitalize selected tokens, introduce invisible tokens and/or replace some characters with homoglyphs (characters which look the same but belong to distinct alphabets or character sets). Yet another exemplary category of distortions comprises introducing special characters, punctuation marks, symbols, emojis, and/or acronyms which carry a particular meaning in online conversations (e.g., #, @, LOL,:P, etc.).

In the example illustrated in FIG. 7, sequel 43 is distorted by selectively replacing some of its tokens with [MASK] placeholders and iteratively invoking generative language module 50 to fill in the masked tokens as described above in relation to FIG. 6. The replaced tokens may be chosen according to a set of grammatical/syntactic criteria and/or according to a result of experimentation. For instance, experiments may reveal that some tokens/words, characters and/or emojis are more likely to trigger unusual chatbot behavior; some embodiments may therefore deliberately distort conversation sequel 43 by including such trigger tokens.

In response to determining challenge 44, in a step 408, challenge generator 34 may determine a set of surrogate responses 48*a-b* (see FIG. 5) mimicking a response to challenge 44 and sequel 43, respectively. Step 408 may be carried out in a manner similar to step 404 described above, with challenge 44 replacing surrogate conversation sequel 43. In some embodiments, a sequence of steps 410-412 may then determine whether challenge 44 satisfies some pre-determined quality condition, and when no, generator 34 may return to step 406 to generate an alternative challenge, for instance by applying a different type of distortion to sequel 43.

Evaluating challenge 44 may comprise determining a likelihood that a chatbot's response to challenge 44 may be substantially different from that of a human. In some embodiments, step 410 comprises evaluating a similarity between two token sequences, for instance, between surrogate conversation sequel 43 and challenge 44, and compare the respective similarity to a pre-determined threshold. Challenges 44 that are not sufficiently removed from sequel 43 may then be rejected as unsatisfactory.

In an alternative embodiment, challenge 44 is deemed satisfactory when a difference $D_c$ between challenge 44 and sequel 43 is smaller than a pre-determined upper bound $\Delta_U$, relying on the observation that a successful challenge will only derail a robot, while challenges that are too strange or out of context may trigger non-standard responses from both humans and robots. Yet other exemplary embodiments may evaluate a difference $D_r$ between surrogate responses 48*a* and 48*b* and determine that challenge 44 is satisfactory when the respective difference exceeds a pre-determined lower threshold $\Delta_L$. Both $\Delta_U$ and $\Delta_L$ may be determined via computer experiments and may be specific to a type of chatbot.

Such criteria may also be combined. In one such example, challenge 44 is deemed satisfactory when $D_c<\Delta_U$ AND $D_r>\Delta_L$. In another example, challenge generator 34 may determine a composite distance:

$$D=\frac{D_c}{D_r}, \quad [1]$$

and determine that challenge 44 is satisfactory when D is lower than a pre-determined threshold.

Challenge generator 34 may use any method known in the art to quantify the similarity between to text sequences. Exemplary similarity measures include various variants of the Levenshtein distance, as well as a distance evaluated in an embedding space, which is further detailed below. Other similarity measures known in the art determine a measure of a sentiment transmitted by a target fragment of text, enabling some embodiments to detect a change in mood (e.g., from neutral to angry, etc.). Yet other exemplary similarity measures may be derived from metrics known in the art of machine translation, such as a bilingual evaluation understudy (BLEU) score or a recall-oriented understudy for gisting evaluation (ROUGE) score. When challenge 44 is deemed satisfactory, challenge 44 is output together with the respective surrogate response(s) 48*a-b* in a step 414 (FIG. 4).

In a step 308 (FIG. 3), challenge generator 34 transmits challenge 44 to conversation agent 32, which in turn instructs messaging application 30 to insert it into the respective ongoing conversation. A further sequence of steps 310-312 listens for a partner response to challenge 44, i.e., for a response received from a conversation partner via messaging application 30. In response to receiving partner response 46, in a step 314 a response analyzer 36 component of chatbot detector 20 may determine a bot verdict 26 indicating whether the author of partner response 46 is a chatbot.

In some embodiments, response analyzer 36 determines bot verdict 26 according to a measure of similarity between partner response 46 and at least one of surrogate responses 48*a-b* determined in step 306. For instance, partner response 46 may be considered to originate from a chatbot when a difference between partner response 46 and surrogate response 48*b* exceeds a pre-determined threshold, which may be determined via experimentation. An alternative embodiment may further determine a difference between partner response 46 and surrogate response 48*a*, and determine that response 46 was authored by a chatbot when items 46 and 48*a* are sufficiently similar. Yet other embodiments may decide according to a similarity between item 46 and item 48*b* AND according to a similarity between item 46 and item 48*a*. For instance, an exemplary embodiment may determine that partner response 46 was generated by a chatbot if response 46 is more similar to surrogate response 48*a* than to surrogate response 48*b*.

Figure 8:
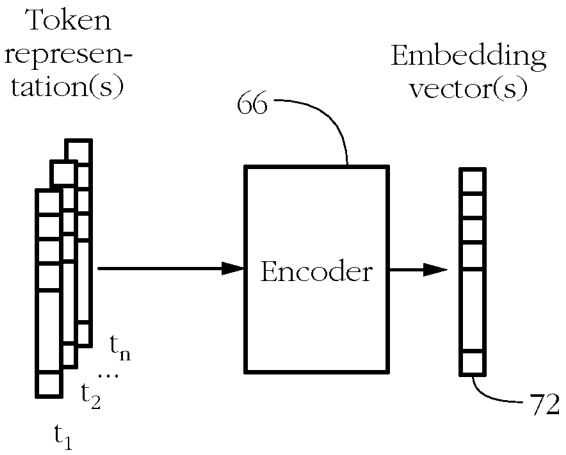
FIG. 8 shows an exemplary encoder computing an embedding vector according to a input token sequence, according to some embodiments of the present invention.

An exemplary similarity measure for use in step 314 may be determined according to a distance separating two token sequences in an abstract hyperspace sometimes referred to as an embedding space. In such embodiments, each token sequence may be represented as a multidimensional embedding vector comprising a plurality of numerical coordinates collectively indicating a position of the respective token sequence in the embedding space. Individual coordinates of the embedding vector are determined by a component of chatbot detector 20 usually known as an encoder. FIG. 8 shows an exemplary encoder 66 transforming a sequence of input tokens into an embedding vector 72. Each token $t_i$ of the input sequence may be represented by a multidimensional representation vector, for instance a one-hot encoded vector determined according to a token dictionary. Encoder 66 may comprise an AI module, for instance a set of pre-trained neural networks. In some embodiments, encoder 66 forms a part of generative language module 50 and is co-trained together with other components of module 50.

Figure 9:
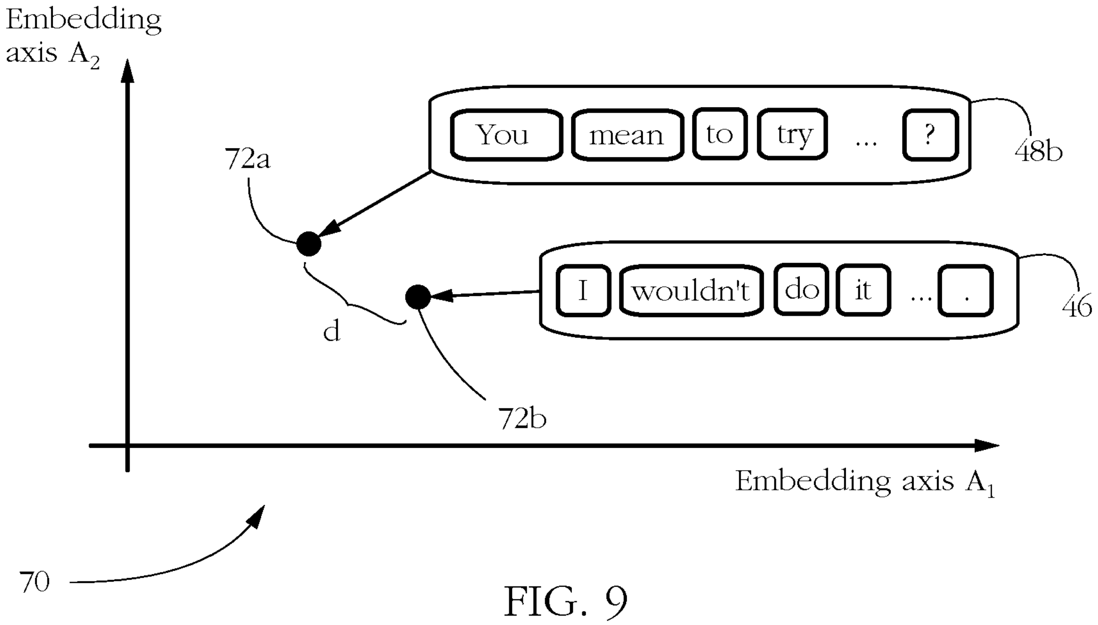
FIG. 9 illustrates an exemplary manner of evaluating a similarity between two token sequences according to some embodiments of the present invention.

FIG. 8 further illustrates an exemplary embedding space 70 and a pair of embedding vectors 72*a-b* representing exemplary surrogate response 48*b* and partner response 46, respectively, according to some embodiments of the present invention. A skilled artisan will know that while the illustrated embedding space has only two dimensions, typical embedding spaces may have hundreds or thousands of dimensions. FIG. 9 further shows an exemplary distance d separating vectors 72*a-b* in embedding space 70, wherein distance d may be used as a measure of similarity of vectors 72*a-b*. Various methods are known in the art for evaluating such similarity measures.

In an alternative embodiment, encoder 66 may calculate an embedding vector for each token of a sequence, and a similarity measure may then be calculated as an aggregated distance combining multiple inter-token distances. An exemplary text token embedding may be calculated using a version of the Word2Vic or Glove algorithms, among others. To produce such token embedding vectors, encoder 66 may be pre-trained on a text corpus, for instance using to a bag-of-words and/or skip-gram algorithm.

Bot verdict 26 may comprise a label (e.g., human, robot, etc.) or a Boolean value indicative of whether the author of partner response 46 is a chatbot or not. Alternatively, verdict 26 may comprise a number indicating a likelihood (e.g., a probability scaled between 0 and 1, with 1 indicating certainty) that response 46 was formulated by a robot. In response to determining verdict 26, chatbot detector 20 may display an indicator of verdict 26 to a user of the respective client system. For instance, some embodiments may employ conversation agent 32 to mark the respective conversation partner accordingly in a user interface of messaging application 30. In one such example, a chatbot conversation partner may be highlighted using a distinctive label, color, icon, etc.

As indicated above, various components of chatbot detector 20, such as generative language module 50 and encoder 66, among others, may comprise pre-trained neural networks. Training herein denotes a process of presenting the respective neural networks with a set of training samples (e.g., a corpus of text formulated in a natural language such as English, Chinese, Russian, etc.), employing the respective networks to determine an output according to the training samples, and in response, adjusting a set of parameters of the respective neural networks (e.g., synapse weights, etc.) according to the respective output. Several training strategies are known in the art, such as supervised and unsupervised training, among others. Generative language models are typically expensive to train in terms of computational resources (processing power and memory), so in typical embodiments training is performed on a dedicated AI training appliance 14 (FIG. 1) comprising dedicated hardware such as an array of graphics processing units (GPUs). Appliance 14 may further manage a set of training corpora 18 tailored to various applications, natural languages, and/or components of chatbot detector 20. A result of training may comprise a set of optimal detector parameter values 24 (e.g., neural network synapse weights, etc.) which may be transmitted to a runtime instance of chatbot detector 20 executing on client systems 10*a-c* and/or utility server 16.

Some embodiments may bypass language model training altogether and use publicly available language models and/or chatbots (such as an implementation of ChatGPT from Open AI, Inc.) to embody some of the functionality of chatbot detector 20. For instance, challenge generator 34 may invoke a remote chatbot to generate surrogate conversation sequel 43 and/or surrogate responses 48*a-b*. In an alternative embodiment, components such as generative language module 50 (FIGS. 6-7) may execute remotely on a server computer and/or may be outsourced as a service.

Figure 10:
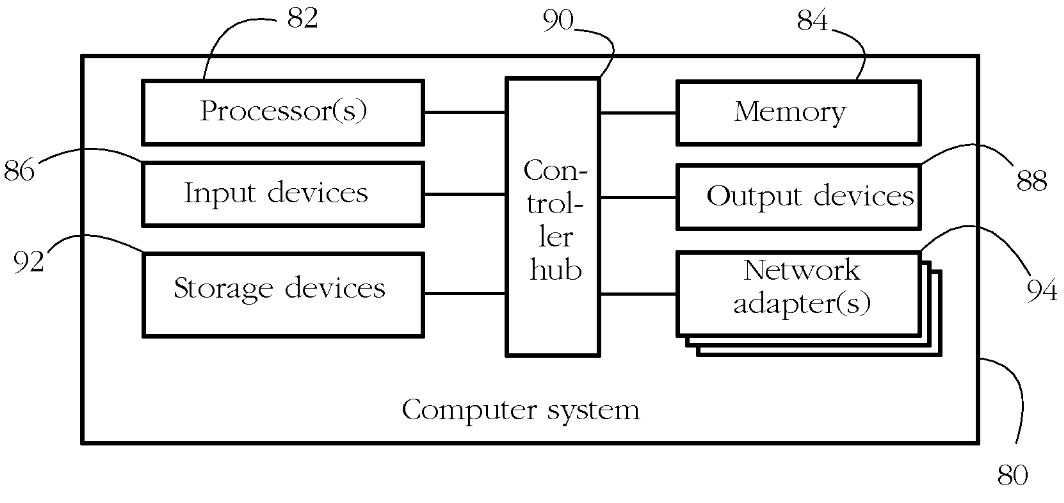
FIG. 10 shows an exemplary hardware configuration of a computer system programmed to execute some of the methods described herein.

FIG. 10 shows an exemplary hardware configuration of a computer system 80 programmed to execute some of the methods described herein. Computer system 80 may generically represent any of client systems 10*a-c*. messaging server 12, utility server 16, and AI training appliance 14 in FIG. 1. The illustrated computer system is a personal computer; other devices such as servers, mobile telephones, tablet computers, and wearables may have slightly different configurations. Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code.

Processors 82 are generally characterized by an instruction set architecture (ISA), which specifies the respective set of processor instructions (e.g., the x86 family vs. ARM® family), and the size of registers (e.g., 32 bit vs. 64 bit processors), among others. The architecture of processors 82 may further vary according to their intended primary use. While central processing units (CPU) are general-purpose processors, graphics processing units (GPU) may be optimized for image/video processing and some forms of parallel computing. Processors 82 may further include application-specific integrated circuits (ASIC), such as Tensor Processing Units (TPU) from Google®, Inc., and Neural Processing Units (NPU) from various manufacturers. TPUs and NPUs may be particularly suited for AI and machine learning applications as described herein.

Memory unit 84 may comprise volatile computer-readable media (e.g. dynamic random-access memory—DRAM) storing data/signals/instruction encodings accessed or generated by processor(s) 82 in the course of carrying out operations. Input devices 86 may include computer keyboards, mice, and microphones, among others, including the respective hardware interfaces and/or adapters allowing a user to introduce data and/or instructions into computer system 80. Output devices 88 may include display devices such as monitors and speakers among others, as well as hardware interfaces/adapters such as graphic cards, enabling the respective computing appliance to communicate data to a user. In some embodiments, input and output devices 86-88 share a common piece of hardware (e.g., a touch screen). Storage devices 92 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 94 enable computer system 80 to connect to an electronic communication network (e.g. network 15 in FIG. 1) and/or to other devices/computer systems.

Controller hub 90 generically represents the plurality of system, peripheral, and/or chipset buses, and/or all other circuitry enabling the communication between processor(s) 82 and the rest of the hardware components of system 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 84, and/or a southbridge connecting processor 82 to devices 86, 88, 92, and 94.

The exemplary systems and methods described above enable performing a Turing test to determine whether an online conversation partner comprises a chatbot. Chatbot technology has benefitted from recent developments in natural language processing, and in particular from the success of large language models such as generative pre-trained transformers (GPT). Currently, the problem of determining whether a conversation partner is robotic or not is critical to many applications, including prevention of fraud and online disinformation.

Conventional robot detection methods include various flavors of CAPTCHA, comprising inviting a user to solve a particular puzzle (e.g., displaying multiple images and asking the user to indicate which one shows a particular item such as a car or a bicycle), and determining whether the respective user is a robot according to a response to the respective puzzle. Conventional CAPTCHA explicitly relies on limitations of current AI systems in dealing with certain problems such as image recognition, among others. Recent improvements in AI are quickly rendering such conventional Turing tests obsolete. In contrast to conventional CAPTCHA tests, some embodiments do not assume any capability or limitation of the target chatbot (apart from the ability to generate plausible text) and instead exploit deeper, intrinsic features of generative language models, such as their inherent chaoticity. Systems and methods described herein may therefore prove more reliable at detecting AI than conventional Turing tests based on CAPTCHA technologies.

A chatbot detector as described herein may directly interface with a messaging application to effectively participate in an ongoing online conversation. An exemplary conversation agent component may be added on to the respective messaging application in the form of an extension or plugin. The respective component may determine a context of an ongoing conversation, attribute individual images to their respective users, and instruct the respective messaging application to submit a continuation to the respective conversation. The chatbot detector may formulate a challenge in the form of at least one conversation message, listen for a response to the respective challenge, and determine whether the respective conversation partner is a chatbot according to the response.

Some embodiments rely on the observation that by being complex systems, generative language models employed by chatbots may display chaotic behavior. One characteristic of chaotic systems is an extreme sensitivity to initial conditions, i.e., slight differences in initial conditions may lead to vastly different futures. The chaotic nature of language models may explain, for instance, why chatbots sometimes output surprising, out-of-context statements, a property known in the art as hallucinating. Some embodiments of the present invention explicitly use such trajectory divergence for chatbot detection, by carefully and deliberately constructing a challenge that would cause a chatbot to deviate from its expected behavior.

To exploit sensitivity to initial conditions, some embodiments construct a surrogate conversation sequel 43 (see e.g., FIG. 5) comprising a plausible continuation of an ongoing conversation. The conversation sequel is then slightly distorted in an attempt to cause a robot to respond in a manner which would otherwise not be expected in the current context of the conversation. The resulting challenge 44 may then be added as a new message to the ongoing conversation. The chatbot detector may evaluate a similarity between a response 46 to the respective challenge received from the respective conversation partner and an artificially generated, plausible response **48*b* to the un-distorted conversation sequel. A substantial difference between partner response 46 and surrogate response 48*b*** may indicate chaotic trajectory divergence and therefore reveal that the respective conversation partner is a chatbot.

The described systems and methods further rely on the observation that a successful challenge 44 should depart only slightly from a plausible conversation sequel 43, so as not to cause a human conversation partner to react in an unexpected way, therefore causing a false positive detection. Some embodiments therefore run a set of quality tests on a candidate challenge before actually submitting the respective challenge to the messaging application. In one example, a challenge is deemed satisfactory when a difference between the respective challenge 44 and the undistorted conversation sequel 43 falls within predetermined upper and lower bounds. In another example, the chatbot detector may generate a plausible response 48*a* to the respective challenge. The respective challenge 44 may then be deemed satisfactory if it stays within a predetermined upper bound away from the undistorted conversation sequel 43, while the surrogate response 48*a* to the respective challenge is farther removed from a surrogate response 48*b* to the undistorted conversation sequel than a pre-determined lower bound.

Exemplary distortions applied to construct the challenge include modifying the generated conversation sequel by introducing particular keywords, special characters and/or emojis, by altering a sentiment of the conversation sequel (for instance from neutral to angry), and changing a type of sentence (for instance from affirmative to negative or interrogative), among others. The specific types of distortion used by the chatbot detector may be updated from time to time, to keep pace with advances in chatbot technology. The choice of distortion may be informed by direct computer experiments comprising various attempts to cause hallucination or trajectory divergence in actual online chatbots.

It will be clear to one skilled in the art that the above embodiments may be altered in many ways without departing from the scope of the invention. Accordingly, the scope of the invention should be determined by the following claims and their legal equivalents.

The invention claimed is:

1. A computer system comprising at least one hardware processor configured to:

apply a generative language model to generate a surrogate conversation sequel and a surrogate response, wherein:
- the surrogate conversation sequel comprises a predicted continuation of an ongoing online conversation comprising a sequence of electronic messages, and
- the surrogate response comprises a predicted response from a conversation partner to the surrogate conversation sequel;

in response, distort the surrogate conversation sequel to produce a challenge message;

add the challenge message to the ongoing online conversation; and in response to receiving a partner response from the conversation partner, the partner response comprising a response to the challenge message, determine whether the conversation partner comprises a robot according to a similarity between the partner response and the surrogate response.

2. The computer system of claim 1, wherein the at least one hardware processor is configured to determine whether the conversation partner comprises the robot according to a result of comparing a similarity measure and a pre-determined threshold, wherein the similarity measure quantifies the similarity between the partner response and surrogate response.

3. The computer system of claim 1, wherein the at least one hardware processor is configured to determine whether the conversation partner comprises the robot further according to a similarity between the partner response and another surrogate response comprising a predicted response from the conversation partner to the challenge message.

4. The computer system of claim 3, wherein the at least one hardware processor is configured to determine whether the conversation partner comprises the robot according to a result of comparing a first similarity measure to a second similarity measure, wherein the first similarity measure quantifies the similarity between the partner response and the surrogate response and the second similarity measure quantifies the similarity between the partner response and the other surrogate response.

5. The computer system of claim 1, wherein distorting the surrogate conversation sequel comprises an item selected from a set consisting of replacing a selected token of the surrogate conversation sequel with a substitute token, adding a token to the surrogate conversation sequel, rephrasing the surrogate conversation sequel as a question, and rephrasing the surrogate conversation sequel to change a sentiment of the surrogate conversation sequel.

6. The computer system of claim 1, wherein the at least one hardware processor is further configured to:

in response to producing the challenge message, determine whether the challenge message satisfies a quality condition according to a similarity between the challenge message and the surrogate conversation sequel, and in response, add the challenge message to the ongoing online conversation only if the challenge message satisfies the quality condition.

7. The computer system of claim 6, wherein the at least one hardware processor is configured to determine whether the challenge message satisfies the quality condition according to a result of comparing a similarity measure to a pre-determined threshold, wherein the similarity measure quantifies the similarity between the challenge message and the surrogate conversation sequel.

8. The computer system of claim 6, wherein the at least one hardware processor is configured to determine whether the challenge message satisfies the quality condition further according to a similarity between the surrogate response and another surrogate response comprising another predicted response from the conversation partner to the challenge message.

9. The computer system of claim 1, wherein the ongoing online conversation comprises an item selected from a group consisting of an exchange of messages carried out via an instant messaging application executing on the computer system, a sequence of messages posted to an online forum, and a sequence of messages posted to a social media page.

10. The computer system of claim 1, wherein applying the generative language model comprises transmitting an encoding of a fragment of the ongoing online conversation to a remote chatbot, and in response, receiving the surrogate conversation sequel or the surrogate response from the remote chatbot.

11. A chatbot detection method comprising employing at least one hardware processor of a computer system to:

apply a generative language model to generate a surrogate conversation sequel and a surrogate response, wherein:
- the surrogate conversation sequel comprises a predicted continuation of an ongoing online conversation comprising a sequence of messages, and
- the surrogate response comprises a predicted response from a conversation partner to the surrogate conversation sequel;

in response, distort the surrogate conversation sequel to produce a challenge message;

add the challenge message to the ongoing online conversation; and in response to receiving a partner response from the conversation partner, the partner response comprising a response to the challenge message, determine whether the conversation partner comprises a robot according to a similarity between the partner response and the surrogate response.

12. The method of claim 11, comprising determining whether the conversation partner comprises the robot according to a result of comparing a similarity measure and a pre-determined threshold, wherein the similarity measure quantifies the similarity between the partner response and surrogate response.

13. The method of claim 11, comprising determining whether the conversation partner comprises the robot further according to a similarity between the partner response and another surrogate response comprising a predicted response from the conversation partner to the challenge message.

14. The method of claim 13, comprising determining whether the conversation partner comprises the robot according to a result of comparing a first similarity measure to a second similarity measure, wherein the first similarity measure quantifies the similarity between the partner response and the surrogate response and the second similarity measure quantifies the similarity between the partner response and the other surrogate response.

15. The method of claim 11, wherein distorting the surrogate conversation sequel comprises an item selected from a set consisting of replacing a selected token of the surrogate conversation sequel with a substitute token, adding a token to the surrogate conversation sequel, rephrasing the surrogate conversation sequel as a question, and rephrasing the surrogate conversation sequel to change a sentiment of the surrogate conversation sequel.

16. The method of claim 11, further comprising employing the at least one hardware processor to:

in response to producing the challenge message, determine whether the challenge message satisfies a quality condition according to a similarity between the challenge message and the surrogate conversation sequel, and in response, add the challenge message to the ongoing online conversation only if the challenge message satisfies the quality condition.

17. The method of claim 16, comprising determining whether the challenge message satisfies the quality condition according to a result of comparing a similarity measure to a pre-determined threshold, wherein the similarity measure quantifies the similarity between the challenge message and the surrogate conversation sequel.

18. The method of claim 16, comprising determining whether the challenge message satisfies the quality condition further according to a similarity between the surrogate response and another surrogate response comprising another predicted response from the conversation partner to the challenge message.

19. The method of claim 11, wherein the ongoing online conversation comprises an item selected from a group consisting of an exchange of messages carried out via an instant messaging application executing on the computer system, a sequence of messages posted to an online forum, and a sequence of messages posted to a social media page.

20. The method of claim 11, wherein applying the generative language model comprises employing the at least one hardware processor to transmit an encoding of a fragment of the ongoing online conversation to a remote chatbot, and in response, receive the surrogate conversation sequel or the surrogate response from the remote chatbot.

21. A non-transitory computer-readable medium storing instructions which, when executed by at least one hardware processor of a computer system, cause the computer system to:

apply a generative language model to generate a surrogate conversation sequel and a surrogate response, wherein:

the surrogate conversation sequel comprises a predicted continuation of an ongoing online conversation comprising a sequence of messages, and the surrogate response comprises a predicted response from a conversation partner to the surrogate conversation sequel;

in response, distort the surrogate conversation sequel to produce a challenge message;

add the challenge message to the ongoing online conversation; and in response to receiving a partner response from the conversation partner, the partner response comprising a response to the challenge message, determine whether the conversation partner comprises a robot according to a similarity between the partner response and the surrogate response.

* * * * *